(12) United States Patent
Corrado et al.

(10) Patent No.: US 7,003,209 B2
(45) Date of Patent: Feb. 21, 2006

(54) FIBER OPTIC CONNECTOR INSTALLATION TOOL

(75) Inventors: Christopher Corrado, Hatfield, PA (US); Joseph F. Cairone, Collegeville, PA (US); David G. Reed, Langhorne, PA (US); Alexander J. Sinton, Doylestown, PA (US)

(73) Assignee: Greene, Tweed of Delaware, Inc., Wilmington, DE (US)

( * ) Notice: Subject to any disclaimer, the term of this patent is extended or adjusted under 35 U.S.C. 154(b) by 0 days.

(21) Appl. No.: 10/963,906

(22) Filed: Oct. 13, 2004

(65) Prior Publication Data

US 2005/0123263 A1   Jun. 9, 2005

Related U.S. Application Data

(60) Provisional application No. 60/511,556, filed on Oct. 14, 2003.

(51) Int. Cl.
*G02B 6/00* (2006.01)

(52) U.S. Cl. ........................ 385/134; 385/147
(58) Field of Classification Search ............... 385/134, 385/147
See application file for complete search history.

(56) References Cited

U.S. PATENT DOCUMENTS

| 869,527 | A | | 10/1907 | Shears |
| 4,179,782 | A | | 12/1979 | Forman |
| 4,253,697 | A | * | 3/1981 | Acosta ................. 294/115 |
| 4,460,826 | A | * | 7/1984 | Pryor ................. 250/227.2 |
| 5,591,203 | A | | 1/1997 | Fahy |
| 5,607,435 | A | * | 3/1997 | Sachdeva et al. .......... 606/139 |
| 5,829,323 | A | | 11/1998 | Liston |
| 5,956,832 | A | * | 9/1999 | Reagan ................. 29/278 |
| 6,389,675 | B1 | | 5/2002 | Tykoski |
| 2003/0045888 | A1 | * | 3/2003 | Brock et al. ............. 606/130 |

* cited by examiner

*Primary Examiner*—Kaveh Kianni
(74) *Attorney, Agent, or Firm*—Flaster/Greenberg P.C.

(57) ABSTRACT

A tool for manipulating a fiber optic connector includes a handle portion having a first major axis and first and second ends. An intermediate support arm having a second major axis extends from the first end of the handle portion. First and second jaws extend from the intermediate support arm. Each jaw extends generally perpendicular to the second major axis of its respective intermediate support arm and generally orthogonal to the first major axis. Each jaw includes a gripping portion having a generally concave shape configured to complementarily receive a portion of the fiber optic connector. Movement of the handle portion moves the jaws between an open position in which the jaws are spaced apart for loosely receiving a fiber optic connector, and a closed position in which the jaws securely grip the fiber optic connector.

11 Claims, 9 Drawing Sheets

FIBER OPTIC CONNECTOR INSTALLATION TOOL

CROSS-REFERENCE TO RELATED APPLICATIONS

This application claims the benefit of U.S. Provisional Patent Application No. 60/511,556 filed Oct. 14, 2003, and entitled "Fiber Optic Connector Installation Tool."

BACKGROUND OF THE INVENTION

Fiber optic connectors which link two fiber optic cables or connect a fiber optic cable to a connection port on a device or system having one or more optical inputs are generally known in the art. Two examples of fiber optic connectors which are typical of those generally known in the art are shown in FIGS. 1 and 2. FIG. 1 shows a typical spring loaded, bayonet-type connector, generally known in the art as an "ST" connector. FIG. 2 shows a typical threaded nut connector generally known in the art as an "FC" connector. Other examples of fiber optic connectors generally known in the art are "LC" and "SC" connectors (not shown).

The fiber optic connectors for the above-identified connections are often located in tightly packed, high density junction boxes or other difficult to reach locations, making it difficult to access the connectors to connect, disconnect or adjust them with the fingers of a human hand. For example, in a junction box, there may be multiple fiber optic connectors in close proximity to each other, thereby making it difficult to access any one individual connector. Alternatively, one or more of the connectors within a junction box or other enclosed area may be partially obscured or blocked by the presence of other components (i.e., wires or hardware) near the connectors, making it difficult to access the connectors. Thus, it would be advantageous to have a tool which a technician can use to assist in connecting or disconnecting the connectors even in difficult to reach places where the technician's fingers cannot reach or do not have enough room to grasp and manipulate the connectors.

BRIEF SUMMARY OF THE INVENTION

Briefly stated, according to a first aspect of the present invention, a tool for manipulating a fiber optic connector includes a handle portion having a first major axis and first and second ends. An intermediate support arm having a second major axis extends from the first end of the handle portion. First and second jaws extend from the intermediate support arm. Each jaw extends generally perpendicular to the second major axis of its respective intermediate support arm and generally orthogonal to the first major axis. Each jaw includes a gripping portion having a generally concave shape configured to complementarily receive a portion of the fiber optic connector. Movement of the handle portion moves the jaws between an open position in which the jaws are spaced apart for loosely receiving a fiber optic connector, and a closed position in which the jaws securely grip the fiber optic connector.

According to a second aspect of the present invention, a tool for manipulating a fiber optic connector includes a handle portion having a first major axis and first and second ends. The handle portion further includes an actuator. An intermediate support arm having a second major axis extends from the first end of the handle portion and is operatively associated with the actuator. First and second jaws extend from the intermediate support arm. Each jaw extends generally perpendicular to the second major axis of the intermediate support arm and generally orthogonal to the first major axis. Each jaw includes a gripping portion having a generally concave shape configured to complementarily receive a portion of the fiber optic connector therein. Movement of the actuator moves the jaws between an open position in which the jaws are spaced apart for loosely receiving a fiber optic connector, and a closed position in which the jaws securely grip the fiber optic connector.

BRIEF DESCRIPTION OF THE SEVERAL VIEWS OF THE DRAWINGS

The following detailed description of preferred embodiments of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
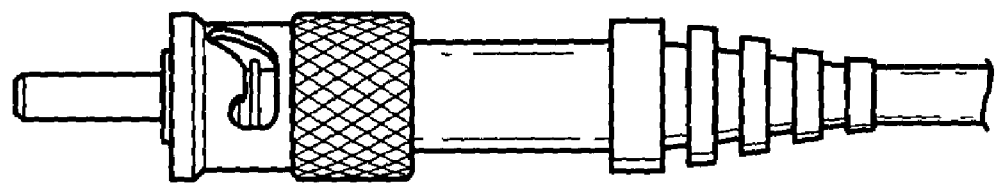
FIG. 1 is a side elevational view of a prior art fiber optic connector.
Figure 2:
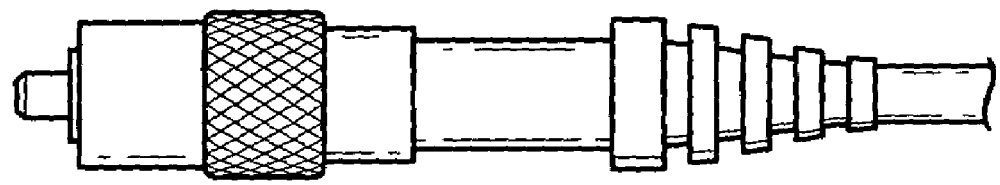
FIG. 2 is a side elevational view of an alternative prior art fiber optic connector.

Referring to the drawings in detail, wherein like numerals represent like elements, there is shown in FIGS. 3–7 a fiber optic connector tool, generally designated 10, in accordance with a first preferred embodiment of the present invention. Fiber optic connectors, for example, the ST and FC connectors shown in FIGS. 1 and 2 as well as LC and SC connectors (not shown), are generally known in the art, and a detailed description thereof is omitted here for convenience only and should not be considered limiting. The fiber optic connector tool 10 enables a user to connect, disconnect and/or otherwise manipulate fiber optic connectors particularly in difficult to reach places.

Figure 3:
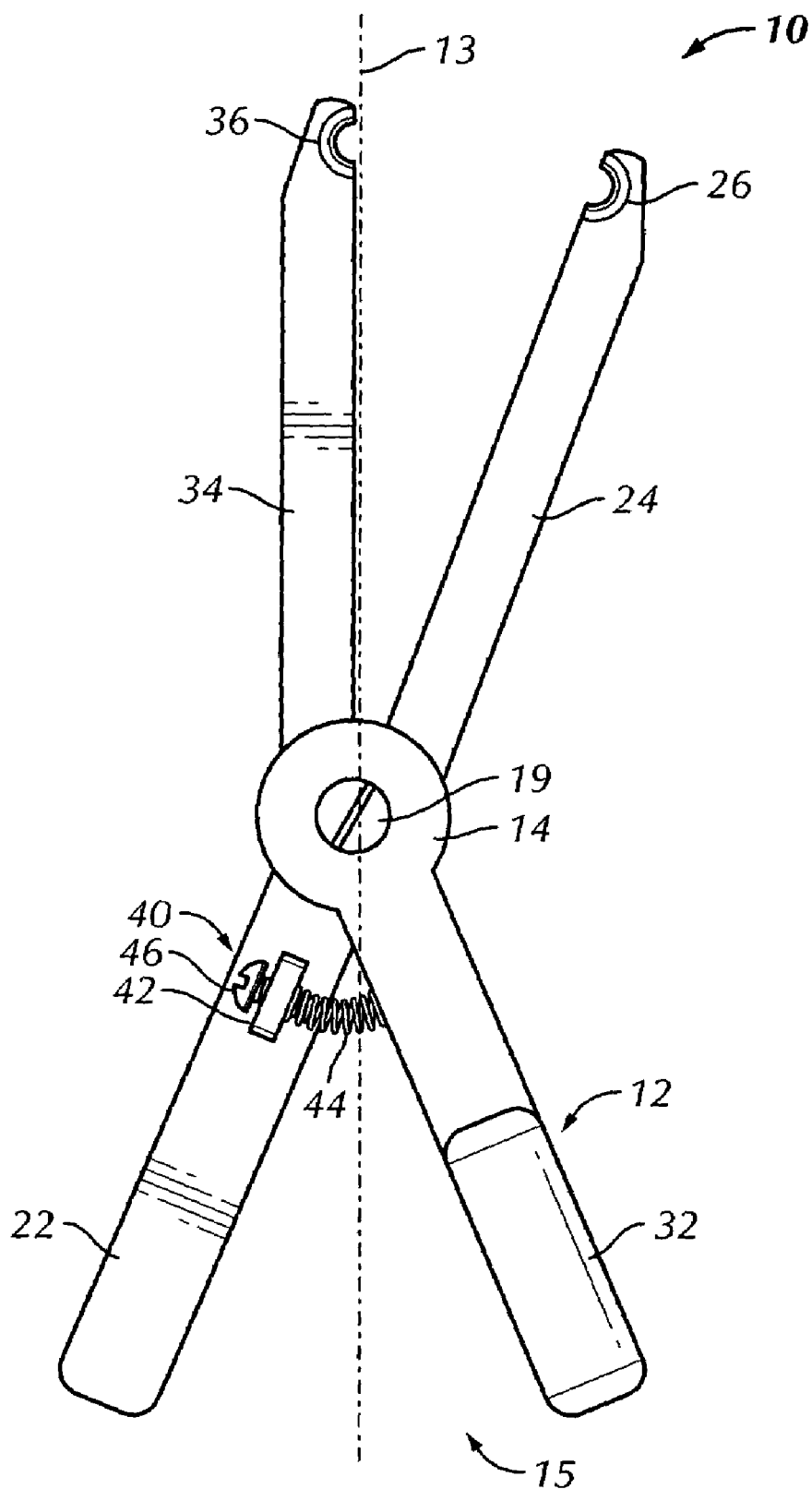
FIG. 3 is a front elevational view of a fiber optic connector tool in accordance with a first preferred embodiment of the present invention.
Figure 4:
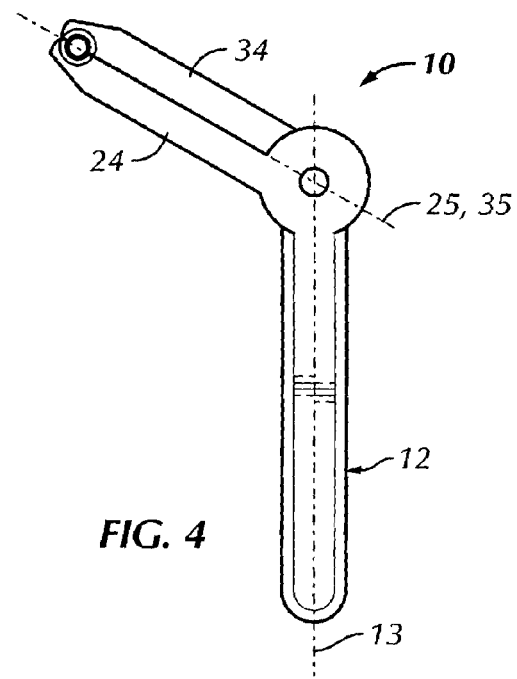
FIG. 4 is a side elevational view of the connector tool of FIG. 3 with the jaw mechanism in a closed position.
Figure 5:
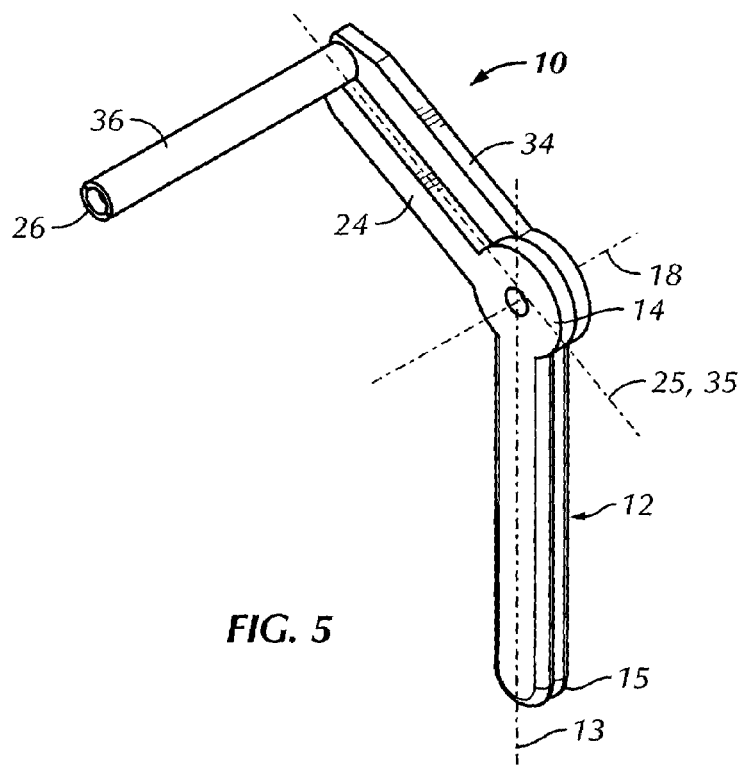
FIG. 5 is a perspective view of the connector tool of FIG. 4.

The connector tool 10 operates and is sized generally like a conventional pair of pliers, and is preferably made of either a polymeric material or metal. The connector tool 10 preferably includes a handle portion 12, intermediate support arms 24, 34 and jaws 26, 36. Each of these parts is formed from a member of a left half 20 (see FIG. 6) and a right half 30 (see FIG. 7), which are assembled together to form the connector tool 10, as shown in FIGS. 3–5, and as discussed in greater detail below. The handle portion 12 includes a first major axis 13 and has first and second ends, 14, 15, respectively. The handle portion 12 may be squeezed or released to close or open the jaws 26, 36, respectively. When closed, the jaws 26, 36 preferably form a generally circular, tubular shape which clamps around a fiber optic connector (such as those shown in FIGS. 1 and 2) to form a friction grip therewith.

Figure 6:
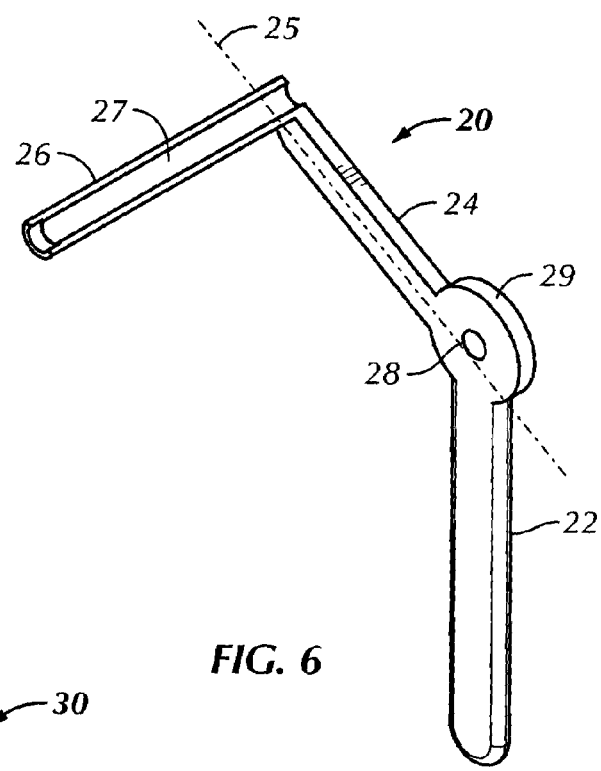
FIG. 6 is an assembly drawing of the left side of the connector tool of FIG. 3.

Referring to FIG. 6, the left half 20 of the connector tool 10 includes a left handle grip 22. A left intermediate support arm 24 is connected at an angle to the left handle grip 22 at the first handle end 14. The left intermediate support arm 24 is defined by a second major axis 25. A lower, first jaw 26 extends from the distal end of the intermediate support arm 24 and generally perpendicularly thereto. The first jaw 26 is therefore also generally orthogonal to the first major axis 13 of the handle portion 12. The first jaw 26 is formed from a half tube or half cylinder and includes a gripping portion 27 that is generally concave in shape. The gripping portion 27 is thus shaped to complementarily receive a portion of a fiber optic connector. The left half 20 further includes a pivot hole 28 in the center of a pivot portion 29 which connects the handle grip 22 to the left intermediate support arm 24.

Figure 7:
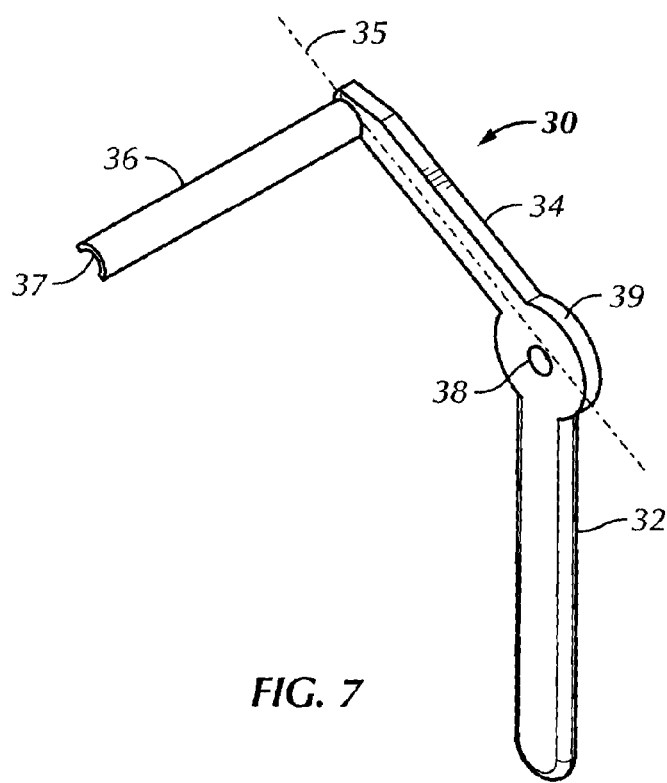
FIG. 7 is an assembly drawing of the right side of the connector tool of FIG. 3.

Referring to FIG. 7, the right half 30 of the connector tool 10 is similar to the left half 20 and includes a right handle grip 32 to which a right intermediate support arm 34 is connected at the first handle end 14. The right intermediate support arm 34 is defined by a second major axis 35. The right handle grip 32 is essentially identical to the left handle grip 22. However, the right support arm 34 is connected to the right handle grip 32 at an angle which is slightly greater than the angle at which the left support arm 24 is connected to the left handle grip 22. The right half 30 further includes an upper, second jaw 36 extending from the distal end of the right intermediate support arm 34 and generally perpendicularly thereto and generally orthogonal to the first major axis 13. The second jaw 36 is formed from a half tube or half cylinder and includes a gripping portion 37 that is generally concave in shape such that it may complementarily receive a portion of a fiber optic connector.

The second jaw 36 is preferably a mirror image of the first jaw 26, such that the two jaws 26, 36 form a generally cylindrical tube when brought together to engage each other, as shown in FIG. 5. Thus, the difference in the angle of the arm pieces 24, 34 with respect to the left and right grips 22, 32 is necessary to ensure that the second jaw 36 matches correctly with the first jaw 26 when engaged with each other. The right half 30 also includes a pivot hole 38 formed in the center of a pivot portion 39 which connects the right handle grip 22 to the right support arm 34. The pivot hole 38 is substantially the same as the pivot hole 28 in the left half 20.

To assemble the connector tool 10, the left and right halves 20, 30 are mated together such that the pivot holes 28, 38, the jaws 26, 36 and the gripping portions 27, 37 generally align with each other. A pivot connector 19 (see FIG. 3) is inserted through both of the pivot holes 28, 38, such that the left and right halves 20, 30 are secured to each other, but may still rotate about the pivot axis 18 with respect to one another. The pivot connector 19 may be, for example, a bolt and nut combination, a rivet or any other fastening mechanism generally known in the art which would secure two halves together in a manner such that they are able to rotate with respect to each other.

When the connector tool 10 is assembled, rotating the left and right halves 20, 30 about the pivot axis 18 causes the jaws 26, 36 to move with respect to each other. That is, rotation of the left and right handle grips 22, 32 about the pivot axis 18 with respect to each other causes the first and second jaws 26, 36 to move toward or away from each other, and thus between a closed position (see FIGS. 4 and 5) and an open position (see FIG. 3), respectively. In the open position, the jaws 26, 36 are spaced apart such that they may loosely receive a fiber optic connector placed therebetween. As the handle portion 12 is squeezed closed, the intermediate support arms 24, 34 cause the jaws 26, 36 to move toward each other and clamp down on whatever object is between the gripping portions 27, 37. When the handle grips 22, 32 are closest together, the intermediate support arms 24, 34 come together such that the gripping portions 27, 37 come together in a jaw-like fashion, forming a generally cylindrical tube, thereby securely gripping a fiber optic connector placed between the jaws 26, 36. Those skilled in the art will recognize that the individual jaws 26, 36 and gripping portions 27, 37 need not be formed from half-tubes and be of generally concave shape, respectively. That is, the jaws 26, 36 and/or gripping portions 27, 37 may be formed to complementarily receive and grip any fiber optic connector generally known in the art without departing from the scope and spirit of the present invention. For example, when gripping LC and SC connectors, the jaws 26, 36 and/or gripping portions 27, 37 may be formed from channels having a generally rectangular cross-section to complementarily receive and grip the rectangular portion of the LC and SC connectors.

To use the connector tool 10 the jaws 26, 36 are first opened by separating the handle grips 22, 32 from each other, thereby rotating the intermediate support arms 24, 34 and the gripping portions 27, 37 away from each other. The connector tool 10 is then centered over the desired portion of the fiber optic connector and the handle grips 22, 32 are clasped together to secure the connector between the gripping portions 27, 37 of the jaws 26, 36. Once the fiber optic connector is grasped by the jaws 26, 26, the fiber optic connector can be easily manipulated by moving and/or rotating the handle grips 22, 32 and/or the connector tool 10 in the desired direction. Additionally, the length of the gripping portions 27, 37 (i.e., the cylindrical tube created by the closing of the jaws 26, 36) extending away from the intermediate support arms 24, 34, allows fiber optic cable connected to the fiber optic connector being grasped in the jaws 26, 36 to extend through the length of the cylindrical tube in a manner which helps keep the cable out of the way during manipulation of the fiber optic connector with the tool 10. This further aids in the connector tool 10 manipulating fiber optic connectors in locations that are difficult to reach with fingers or other tools.

The connector tool 10 preferably also includes a grip biasing mechanism 40 (see FIG. 3). The biasing mechanism 40 preferably includes a hook or loop 42 formed on one of the handle grips 22, 32, and a spring 44 which is inserted through the hook or loop 42. The end of the spring 44 is retained within the hook or loop 42 by a clip, screw or latch 46. The opposite end of the spring 44 is attached to the other grip 22, 32 in a similar manner (not shown). The spring 44 of the biasing mechanism 40 thus biases the grip members 22, 32 away from each other, thereby resulting in the jaws 26, 36 being biased to the open position. Therefore, the jaws 26, 36 will only close when the grip members 22, 32 are squeezed together. Such a configuration makes it easier for a technician to operate the connector tool 10 within difficult to reach areas since the jaws 26, 36 default to the open position.

Figure 8:
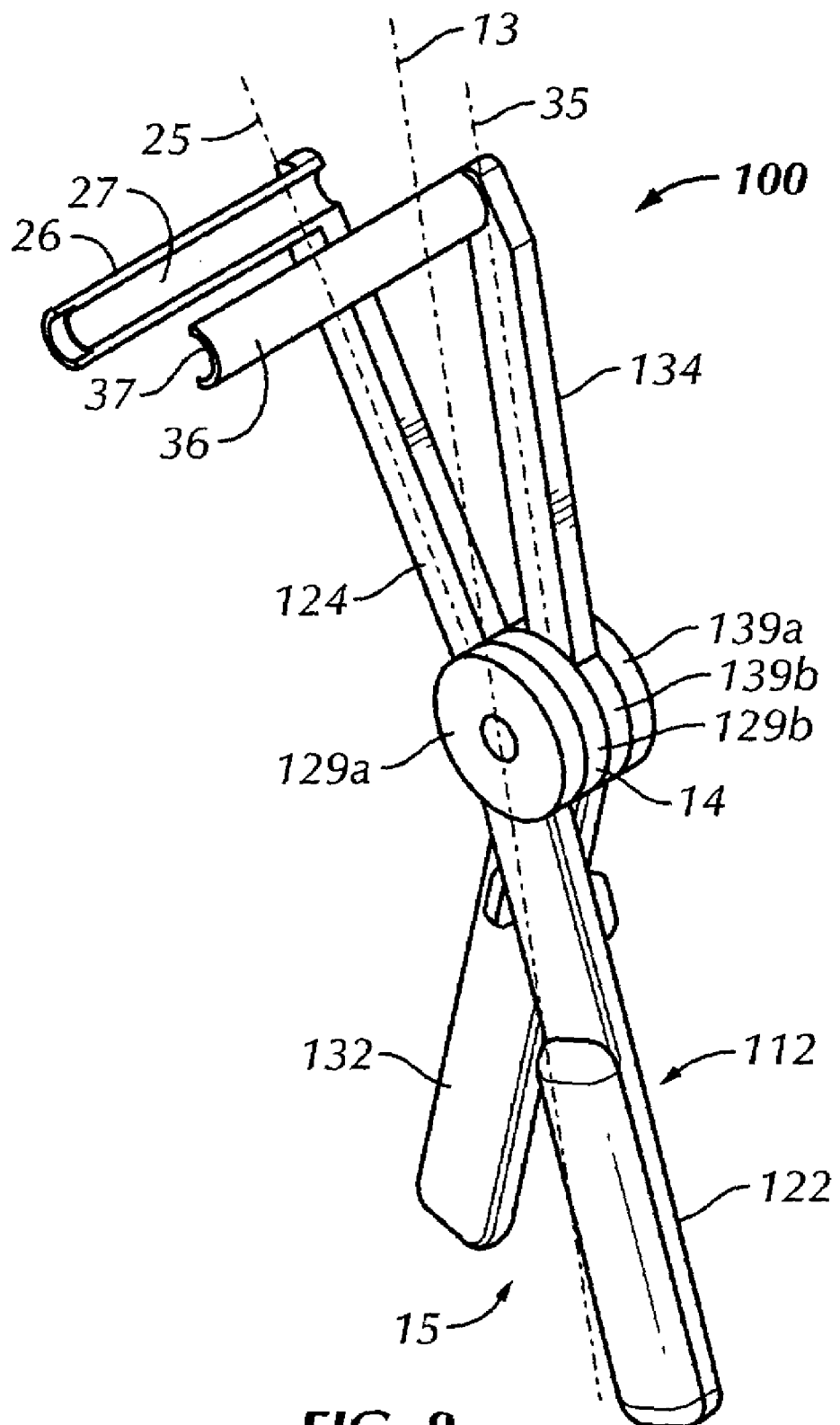
FIG. 8 is a perspective view of a fiber optic connector tool in a open position in accordance with a second preferred embodiment of the present invention.
Figure 9:
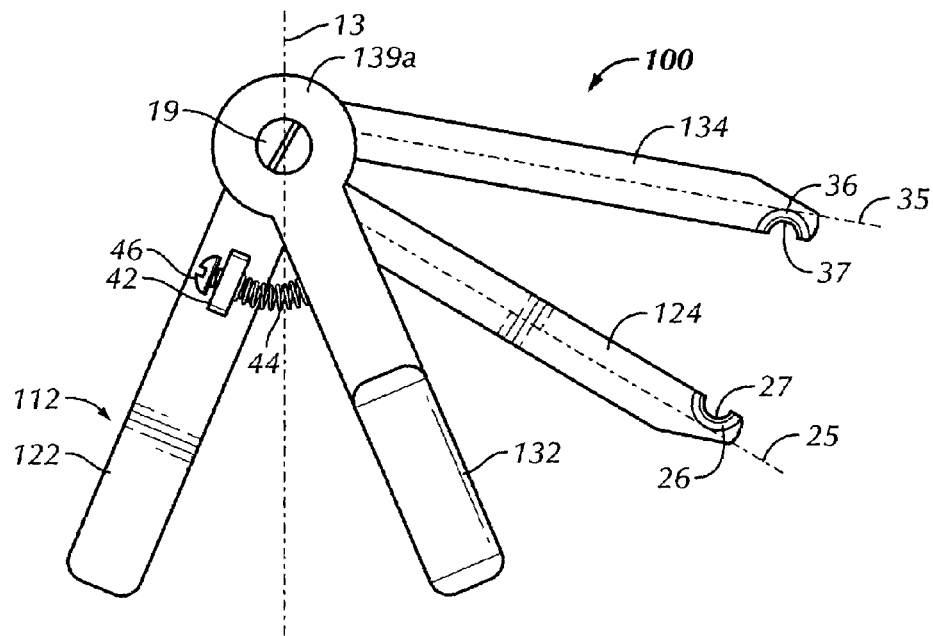
FIG. 9 is a front elevational view of the connector tool of FIG. 8 in an angled configuration.
Figure 10:
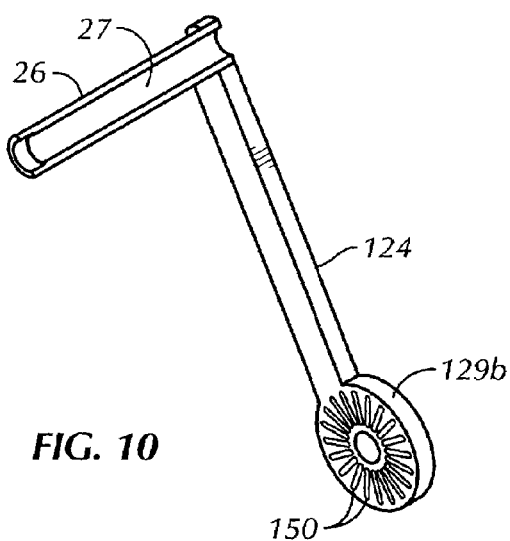
FIG. 10 is perspective view of the left arm piece of the connector tool of FIG. 8.

Referring to FIGS. 8–10, a connector tool 100 according to a second preferred embodiment of the present invention is shown. The tool connector 100 includes substantially the same elements as the tool connector 10 described above with reference to FIGS. 3–7, and all of the like elements are labeled with the same reference numerals. The connector tool 100 includes left and right halves which are each formed from two individual, separate pieces. The right half of the connector tool 100 includes a right handle grip 132 which is not integrally formed with the right intermediate support arm 134 and upper, second jaw 36. The second jaw 36 is attached to the right intermediate support arm 134 in substantially similar manner as in the connector tool 10 above. Similarly, the left half of the connector tool 100 includes a left handle grip 122 and a separate left intermediate support arm 124 having a lower, first jaw 26 attached thereto. At their respective ends, the right handle grip 132, right intermediate support arm 134, left handle grip 122 and left intermediate support arm 124 each include a generally circular pivot portion 139a, 139b, 129a and 129b having a pivot hole (not shown) which is similar to the single pivot portion 29 in the connector tool 10. The inwardly facing surface of each pivot portion 139a, 139b, 129a, 129b includes a series of teeth or ribs 150 (see FIG. 10). The inner surface of the pivot portion 139a mates with the inner surface of the pivot portion 139b, such that the ribs 150 prevent rotation of the pivot portions 139a, 139b with respect to each other. Thus, the angle between the handle grip 132 and the right intermediate support arm 134 is adjustable, depending on the desired configuration of the connector tool 100. Similarly, the inner surfaces of the pivot portions 129a, 129b mate with each other via the ribs 150, allowing the left handle grip 122 and left intermediate support arm 124 to be adjustable with respect to each other. As with the connector tool 10, all four pieces 122, 124, 132, 134 are secured together using a pivot connector 19 which allows the right half to rotate with respect to the left half. As a result, the connector tool 100 may be configured as shown in FIG. 9, such that the intermediate support arms 124, 134 are releasably secured with respect to the handle portion 112 to form an acute angle between the first major axis 13 and the second major axis 25, 35. Accordingly, the jaws 26, 36, and thus gripping portions 27, 37 may be positioned at a variety of angles with respect to the handle portion 112, as opposed to generally opposite the handle portion 12 in the connector tool 10 described above. The connector tool 100 thus may be preferred depending on the orientation or location of the fiber optic connectors to be manipulated within the junction box or other location.

In another embodiment (not shown) the connector tool according to the present invention includes a ratchet mechanism centered about the pivot axis to further assist in manipulating fiber optic connectors with the device once the jaw mechanism has closed down thereon. A ratchet mechanism on the connector tool eliminates the need for the technician to repeatedly open the jaw mechanism and reposition the connector tool to manipulate the desired connector in a tightly packed area.

Figure 11:
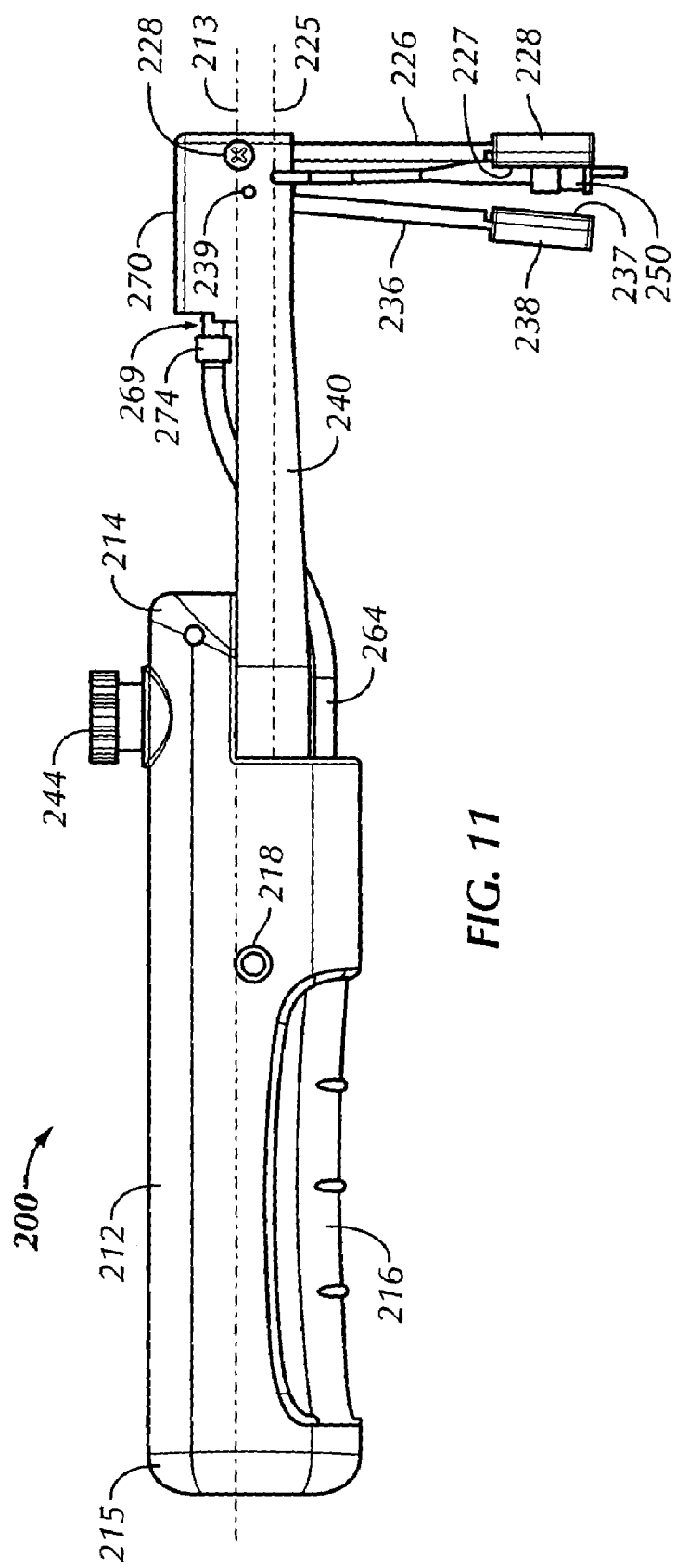
FIG. 11 is a side elevational view of a fiber optic connector tool with a typical fiber optic connector in accordance with a third preferred embodiment of the present invention.
Figure 12:
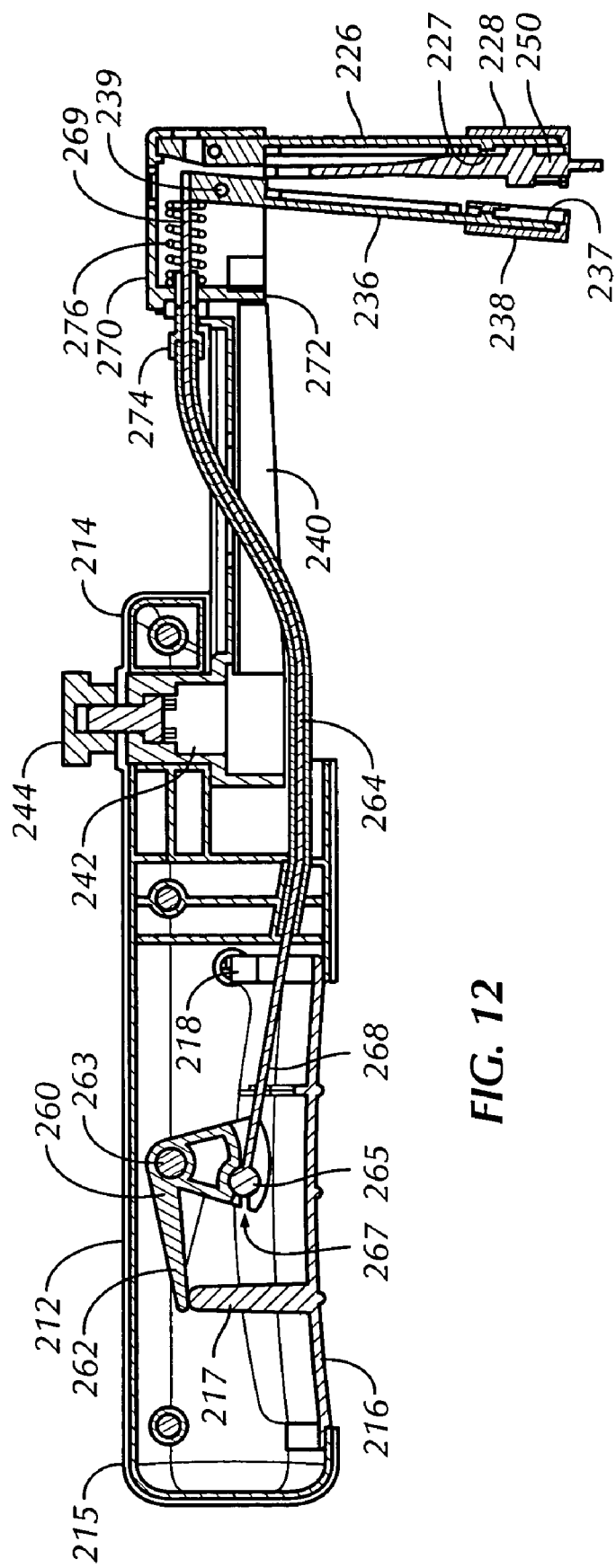
FIG. 12 is a cross-sectional view of the fiber optic connector tool of FIG. 11.
Figure 13:
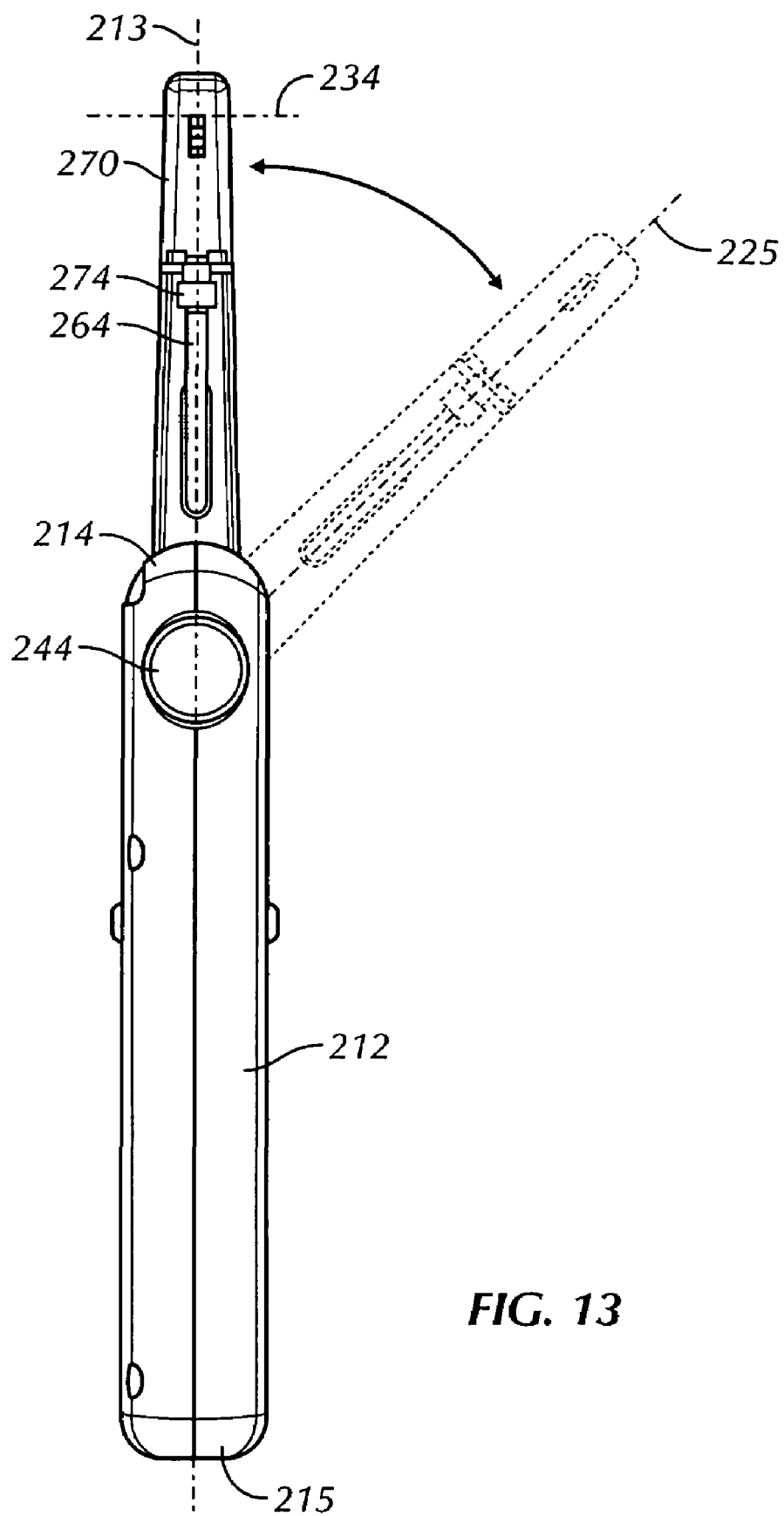
FIG. 13 is a top view of the fiber optic connector tool of FIG. 11.

Referring to FIGS. 11–13, a fiber optic connector tool 200 according to a third preferred embodiment of the present invention is shown. Similar to the fiber optic connector tools 10, 100 described above, the fiber optic connector tool 200 enables a user to connect, disconnect and/or otherwise manipulate fiber optic connectors. In FIGS. 11 and 12 a fiber optic connector 250 is shown between the jaws of the connector tool 200. The connector 250 is shown for illustrative purposes only, and any type of fiber optic connector generally known in the art is contemplated for use with the present invention.

The connector tool 200 preferably includes a handle portion 212, generally in the shape of a cylindrical tube which may be comfortably grasped and held by a user's hand. However, those skilled in the art will understand that the handle portion 212 may have a variety of shapes without departing from the spirit and scope of the present invention. The handle portion 212 includes a first major axis 213 and has first and second ends, 214, 215, respectively. The handle portion 212 further includes an actuator 216, the accompanying assembly of which will be described in greater detail below. The actuator 216 on the handle portion 212 may be squeezed or released to close or open, respectively, the jaws 226, 236.

The connector tool 200 further includes an intermediate support arm 240 connected to the handle portion 212 at the first end 214. The intermediate support arm 240 is defined by a second major axis 225. The intermediate support arm 240 is preferably attached to the handle portion 212 at support pivot 242 such that the intermediate support arm 240 is rotatable with respect to the handle portion 212. When the intermediate support arm 240 rotates with respect to the handle portion 212, the intermediate support arm rotates in a plane (not shown) which is parallel to both the first major axis 213 and the second major axis 225. The intermediate support arm 240 is preferably releasably secured to the handle portion 212 using a set screw 244. The set screw 244 screws downwardly through the handle portion 212 and into the support pivot 242. Accordingly, the intermediate support arm 240 may be rotated with respect to the handle portion 212 and secured in such a position using the set screw 244 such that an acute angle is formed between the first major axis 213 and the second major axis 225. FIG. 13 shows a phantom view of the intermediate support arm 240 rotated to for such an acute angle with respect to the handle portion 212. The intermediate support arm 240 includes a jaw housing 270 at the end of the support arm opposite the first end 214 of the handle portion 212.

A first jaw 226 extends from the end of the intermediate support arm 240 and generally perpendicularly thereto. The first jaw 226 is therefore also generally orthogonal to the first major axis 213 of the handle portion 212. The upper portion of the jaw 226 resides within the jaw housing 270. The first jaw 226 is preferably non-rotatably but releasably attached to the intermediate support arm 240 within the jaw housing 270 using a screw 228. Those skilled in the art will recognize that the first jaw 226 may be attached to the intermediate support arm in an alternate manner without departing from the spirit and scope of the present invention. The first jaw 226 preferably further includes a gripping portion 227 having a generally concave shape, such that the gripping portion 227 may complementarily receive a at least a portion of a fiber optic connector therein. For example, as shown in FIGS. 11 and 12, the gripping portion 227 of the first jaw 226 complementarily receives a portion of the fiber optic connector 250.

A second jaw 236 extends from the intermediate support arm 240 and generally perpendicularly thereto and generally orthogonal to the first major axis 213. The second jaw 236 is slightly spaced from the first jaw 226, and is thus attached to the intermediate support arm 240 away from the first jaw 226 in the direction of the handle portion 212. The upper portion of the second jaw 236 is attached to the intermediate support arm 240 within the jaw housing 270 via a pivot rod 239 extending through the jaw housing 270. Accordingly, the second jaw 236 is rotatable with respect to the intermediate support arm 240 and the handle portion 212 about the longitudinal axis 234 of the pivot rod 239. The second jaw 236 preferably further includes a gripping portion 237 having a generally concave shape, such that the gripping portion 237 may complimentarily receive at least a portion of a fiber optic connector therein. The gripping portion 237 of the second jaw 236 is preferably a mirror image of the gripping portion 227 of the first jaw 226, such that when the jaws 226, 236 are brought together, the gripping portions 227, 237 for a generally circular or cylindrical shape with which to grip the fiber optic connector 250. As noted with respect to the fiber optic connector tools 10, 100 discussed above, the gripping portions 227, 237 of the connector tool 200 may be any shape that corresponds to a fiber optic connector generally known in the art. For example, the gripping portions 227, 237 may be shaped such that they form a generally rectangular cross-section (i.e., for gripping LC and SC connectors) when the jaws 226, 236 are brought together.

The gripping portions 227, 237 of the jaws 226, 236 preferably are formed from grip pads 228, 238, respectively, which are releasably attached to each of the jaws 226, 236. The grip pads 228, 238 slide onto the ends of their respective jaws, and are attached thereto via a knob and notch combination (now shown). However, the grip pads 228, 238 may be attached to the jaws 226, 236 in any manner generally known in the art, including friction fit or clamps. The grip pads 228, 238 are preferably formed from a material which conforms to the shape of the fiber optic connector 250, such as a generally soft and/or pliable polymeric material. It will be understood by those skilled in the art that the grip pads 228, 238 may be interchanged with other grip pads (not shown) which may be better suited for gripping and/or conforming to the shape of various fiber optic connectors. In the preferred embodiment shown in FIGS. 11–13, the grip pads 228, 238 have a generally concave shape to complimentarily receive the fiber optic connector 250.

As shown in FIGS. 11 and 12, the actuator 216 is a lever which pivots about a pivot 218 within the handle portion 212 approximately half-way between the first and second ends 214, 215. Thus, the actuator 216 is displaceable at least partially into the interior of the handle portion 212. The actuator includes a projection 217 extending upwardly therefrom near the second end 215. When the actuator 216 is moved upwardly, the projection 217 contacts an arm 262 of the pivot lever 260 that is attached to the interior of the handle portion 212. The pivot lever 260 pivots around pivot 263. A cable 264 having first and second ends 268, 269, respectively, is attached to the pivot lever 260. More specifically, the second end 268 of cable 264 includes a knob 265 which is clamped within a recess 267 in the lower portion of the pivot lever 260. Thus, rotation of the pivot lever 260 in a clockwise direction (e.g. caused by upward movement of the actuator 216 and projection 217 as shown in FIG. 12) causes the cable 264 to be retracted toward the second end 215 of the handle portion 212 along the first major axis 213. The cable 264 extends through the handle portion 212 and through the intermediate support arm 240 and into the jaw housing 270. The second end 269 of the cable 264 attaches to the upper portion of the second jaw 236 above the pivot rod 239. The cable 264 is preferably fixed to the second jaw 236 by passing through a hole in the jaw 236 and being clamped with a set screw (not shown).

Movement of the cable 264 according to movement of the pivot lever 260 thus pivots the second jaw 236 about the pivot rod 239 and longitudinal axis 234, thereby moving the second jaw 236 toward and away from the first jaw 226. As a result, movement of the handle portion 212 and more specifically the actuator 216, causes the jaws 226, 236 to move between an open position (see FIG. 11) in which the jaws 226, 236 are spaced apart and a closed position (not shown) in which the jaws 226, 236 securely grip a fiber optic connector 250 placed between the jaws 226, 236 via the gripping portions 227, 237. In the open position, the jaws 226, 236 loosely receive the fiber optic connector 250 therebetween.

A biasing spring 276 resides within the jaw housing 270 between the second jaw 236 and an end wall 272 of the jaw housing 270. Thus, absent any force applied by the cable 264 on the second jaw 236, the biasing spring 276 biases the second jaw 236 away from the first jaw 226, such that the jaws 226, 236 are biased to the open position as shown in FIG. 11. Thus, when the actuator 216 is moved upwardly into the handle portion 212 to pull on the cable 264, the cable 264 pulls on the upper end of the second jaw 236, thereby compressing the biasing spring 276 and moving the second jaw 236 into the closed position with the first jaw 226. When the actuator 216 is released, the cable 264 releases force on the second jaw 236 and the biasing spring 276 pushes the upper end of the second jaw 236 away from the end wall 272, thereby moving the second jaw 236 and the gripping portion 237 away from the first jaw 226. The cable 264 further includes an adjusting mechanism 274, which works in cooperation with the end wall 272. The adjusting mechanism 274 lengthens or shortens the path of the cable 264, thus changing the distance between the jaws 226, 236 to adjust for wear, increase clearance between the jaws 226, 236, or enable the jaws 226, 236 to more tightly grip the connector 250. The set screw attaching the cable 264 to the second jaw 236 is accessible through a slot (not shown) in the back of the jaw housing 270 and can be used for gross adjustments of the second jaw position. The adjusting mechanism 274 is used for finer adjustments.

In use, the fiber optic connector tool 200 may be used to manipulate fiber optic connectors such as the fiber optic connector 250, particularly within difficult to reach places. The jaws 226, 236 may be positioned around or over the fiber optic connector 250 as shown in FIG. 11 to loosely receive the fiber optic connector 250. The user may then move the actuator 216 into the handle portion 212, thereby causing the second jaw 236 to move toward the first jaw 226 and thus into the closed position to form a secure friction grip with the fiber optic connector 250. The user may then manipulate the fiber optic connector 250 as desired. When the operation is complete, the user releases the actuator 216 and the biasing action of the biasing spring 276 forces the second jaw 236 to move away from the first jaw 226 and into the open position, thereby releasing the fiber optic connector 250 from the grip of the jaws. Depending on the situation and location of the fiber optic connector 250, the user may also manipulate the set screw 244 on the handle portion 212 and rotate the intermediate support arm 240 to a position, for example, as shown in FIG. 13, such that the intermediate support arm 240 is at an acute angle with respect to the handle portion 212. The set screw 244 may then be re-tightened to secure the intermediate support arm 240 in the desired angular position. The fiber optic connector tool 200 is capable of performing the same functions and operations when the intermediate support arm 240 forms an acute angle with respect to the handle portion 212.

Those of ordinary skill in the art will recognize that any of the above embodiments of the fiber optic tool connector according to the present invention may include a jaw mechanism of substantially different design. For example, the jaw mechanism need not be comprised of two half tubes, but may include parts of a different shape or size, or be attached to the arm price in a different orientation or location, without departing from the spirit and scope of the present invention. As would be understood by those skilled in the art, different shapes and configurations of the jaw mechanism would allow the described fiber optic connector tools 10, 100, 200 to receive and grip fiber optic connectors having various shapes and sizes.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

We claim:

1. A tool for manipulating a fiber optic connector, the tool comprising:
   a handle portion having a first major axis and first and second ends, the handle portion including an actuator;
   an intermediate support arm extending from the first end of the handle portion, the intermediate support arm having a second major axis; and
   first and second jaws extending from the intermediate support arm and being operatively associated with the actuator, each jaw extending outwardly away from and generally perpendicular to the second major axis of the intermediate support arm and generally orthogonal to the first major axis, each jaw including a gripping portion having a generally concave shape configured to complementarily receive a portion of the fiber optic connector therein, wherein movement of the actuator moves the jaws between an open position, wherein the jaws are spaced apart for loosely receiving a fiber optic connector therebetween, and a closed position, wherein the jaws securely grip the fiber optic connector, with the jaws extending outwardly away from the second major axis in both the open and closed positions.

2. The tool of claim 1 wherein the first jaw is non-rotatably attached to the intermediate support arm and wherein movement of the actuator moves the second jaw toward and away from the first jaw, thereby forming the closed and open positions, respectively.

3. The tool of claim 2 further comprising a cable connecting the actuator to the second jaw, wherein movement of the second jaw with the actuator is effected by the cable.

4. The tool of claim 1 wherein the intermediate support arm is rotatable with respect to the handle portion in a plane generally parallel to the first and second major axes.

5. The tool of claim 4 wherein the intermediate support arm is releasably secured with respect to the handle portion such that an acute angle is formed between the first and second major axes.

6. The tool of claim 5 further comprising a set screw attached to the handle portion, the set screw releasably securing the intermediate arm to the handle portion.

7. The tool of claim 1 wherein in the closed position the gripping portions form a generally circular grip around the fiber optic connector.

8. The tool of claim 1 wherein the gripping portions comprise a grip pad releasably attached to each jaw.

9. The tool of claim 8 wherein the grip pad is constructed of a material which conforms to the shape of a fiber optic connector.

10. The tool of claim 1 further wherein the jaws are biased to the open position.

11. The tool of claim 10 wherein a spring in the intermediate support arm biases the second jaw away from the first jaw.

* * * * *